(12) United States Patent
Liang et al.

(10) Patent No.: US 7,542,281 B2
(45) Date of Patent: Jun. 2, 2009

(54) MOUNTING APPARATUS FOR STORAGE DEVICE

(75) Inventors: Chun-Chi Liang, Taipei Hsien (TW); Guang-Yao Lee, Taipei Hsien (TW); Hsuan-Tsung Chen, Taipei Hsien (TW); Shu-Gang Shi, Shenzhen (CN); Chun-Fu Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 137 days.

(21) Appl. No.: 11/565,649

(22) Filed: Dec. 1, 2006

(65) Prior Publication Data

US 2007/0235625 A1    Oct. 11, 2007

(30) Foreign Application Priority Data

Apr. 5, 2006    (CN) .................. 2006 2 0013425

(51) Int. Cl.
*G06K 1/16* (2006.01)
*H05K 5/00* (2006.01)

(52) U.S. Cl. ............... 361/685; 248/27.3; 361/727; 312/334.7; 211/41.17

(58) Field of Classification Search ............. 248/349.1, 248/27.3, 316.8, 694; 312/223.2, 334.7; 211/41.17; 361/685, 727
See application file for complete search history.

(56) References Cited

U.S. PATENT DOCUMENTS

| | | | |
|---|---|---|---|
| 5,587,889 A | 12/1996 | Sacherman | |
| 6,275,377 B1 | 8/2001 | Liu et al. | |
| 6,330,147 B1 | 12/2001 | Adams et al. | |
| 6,760,226 B2 | 7/2004 | Chen | |
| 6,771,496 B1 * | 8/2004 | Wu | 361/685 |
| 6,980,430 B2 * | 12/2005 | Su | 361/685 |
| 7,068,502 B2 * | 6/2006 | Chen et al. | 361/685 |
| 7,327,565 B2 * | 2/2008 | Chen et al. | 361/685 |
| 2005/0078445 A1 * | 4/2005 | Chen et al. | 361/685 |
| 2005/0116135 A1 * | 6/2005 | Peng et al. | 248/694 |
| 2005/0121581 A1 * | 6/2005 | Chen et al. | 248/316.8 |
| 2005/0128697 A1 * | 6/2005 | Su | 361/685 |
| 2005/0195564 A1 * | 9/2005 | Peng et al. | 361/685 |

* cited by examiner

*Primary Examiner*—Anita M King
(74) *Attorney, Agent, or Firm*—Wei Te Chung

(57) ABSTRACT

An exemplary mounting apparatus for a storage device includes a bracket, and a latch member assembly. The storage device includes a plurality of apertures defined in a sidewall thereof. The bracket includes a plurality of apertures defined in a side panel thereof, corresponding to the apertures of the storage device. The latch assembly includes a frame fixed to the side panel, a sliding member slidably attached to the frame, and a latch member attached to sliding member. The latch member includes a plurality of tips extending therefrom. The sliding member is movable in a direction parallel to the side panel. The latch member is accordingly movable toward or away from the side panel in a direction perpendicular to the side panel. The tips of the latch member extend into or withdraw from the apertures of the side panel and the storage device to secure or disengage the storage device.

18 Claims, 10 Drawing Sheets

MOUNTING APPARATUS FOR STORAGE DEVICE

BACKGROUND

1. Field of the Invention

The present invention relates to mounting apparatuses, and more particularly to a mounting apparatus for readily holding a storage device.

2. General Background

Generally speaking, when a computer is assembled, a drive bracket is mounted in a computer enclosure, and then data storage devices are fixed to the drive bracket. The data storage devices include various combinations of hard disk drives (HDDs), floppy disk drives (FDDs), and compact disk-read only memory (CD-ROM.) drives.

Conventionally, a storage device is attached to a drive bracket of a computer by bolts. However, attachment by bolts is complicated and time-consuming. Furthermore, attachment by such means requires extra work space be available inside the computer enclosure. This requirement runs counter to the trend toward miniaturization in the computer industry.

What is desired, therefore, is a mounting apparatus which readily allows securely installing or removing a storage device to or from a computer enclosure.

SUMMARY

In one preferred embodiment, a mounting apparatus for a storage device includes a bracket, and a latch member assembly. The storage device includes a plurality of apertures defined in a sidewall thereof. The bracket includes a plurality of apertures defined in a side panel thereof, corresponding to the apertures of the storage device. The latch assembly includes a frame fixed to the side panel, a sliding member slidably attached to the frame, and a latch member attached to the sliding member. The latch member includes a plurality of tips extending therefrom. The sliding member is movable in a direction parallel to the side panel. The latch member is accordingly movable toward or away from the side panel in a direction perpendicular to the side panel. The tips of the latch member extend into or withdraw from the apertures of the side panel and the storage device to secure or disengage the storage device.

Other advantages and novel features will become more apparent from the following detailed description of preferred embodiments when taken in conjunction with the accompanying drawings, in which:

DETAILED DESCRIPTION OF THE INVENTION

Figure 1:
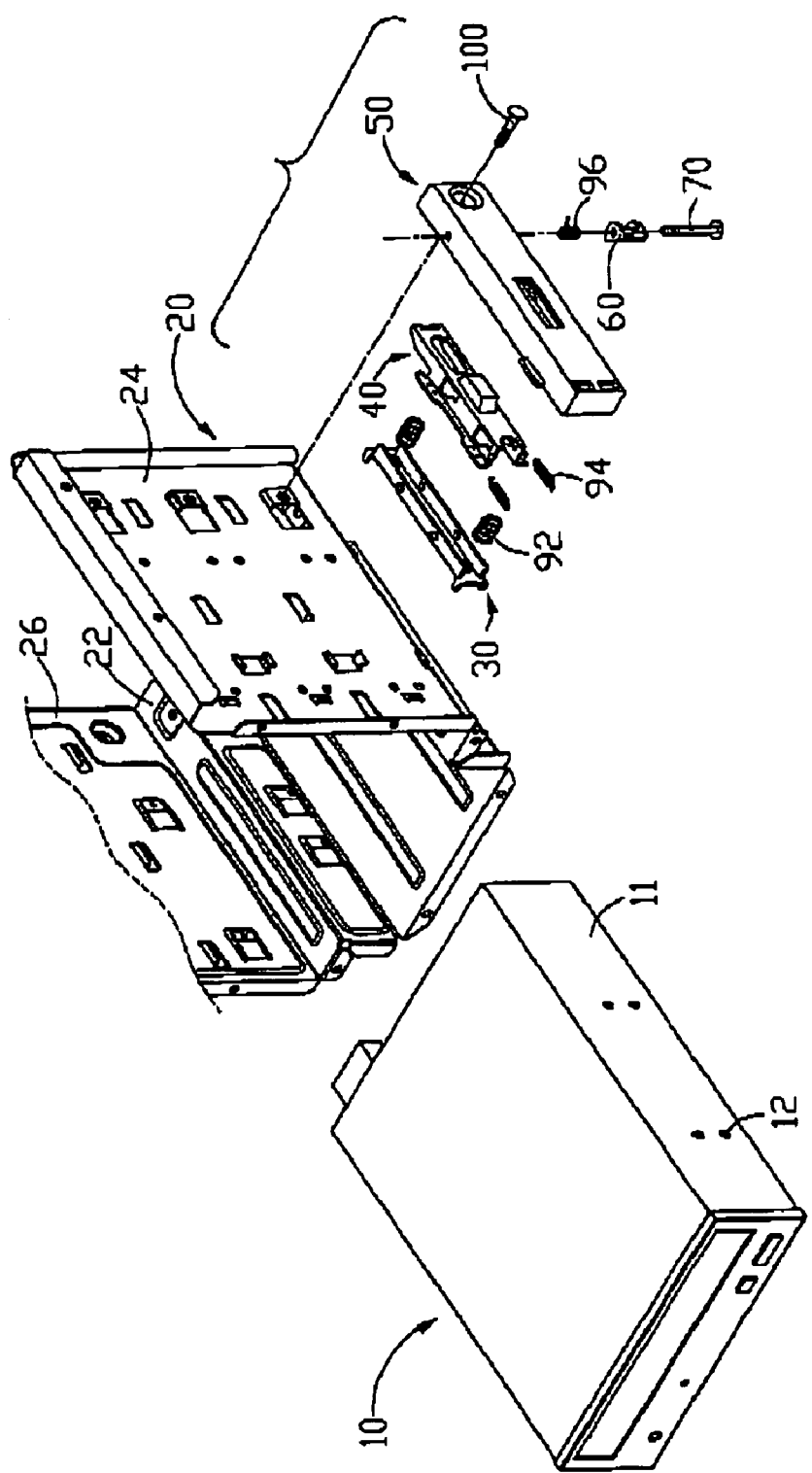
FIG. 1 is an exploded, isometric view of a mounting apparatus in accordance with a first preferred embodiment of the present invention, together with a storage device, the mounting apparatus including a bracket, and a latching assembly, the latch assembly including a latch member, a sliding member, a frame, and a pivoting member.

Referring to FIG. 1, in a first preferred embodiment of the invention, a mounting apparatus of an electronic device like a computer is provided for holding a functional device like a storage device 10 in place. The storage device 10 includes two pairs of apertures 12 defined in one of sidewalls 11 thereof. The mounting apparatus includes a bracket 20, and a latch assembly attached to the bracket 20 to secure the storage device 10 in the bracket 20.

Figure 2:
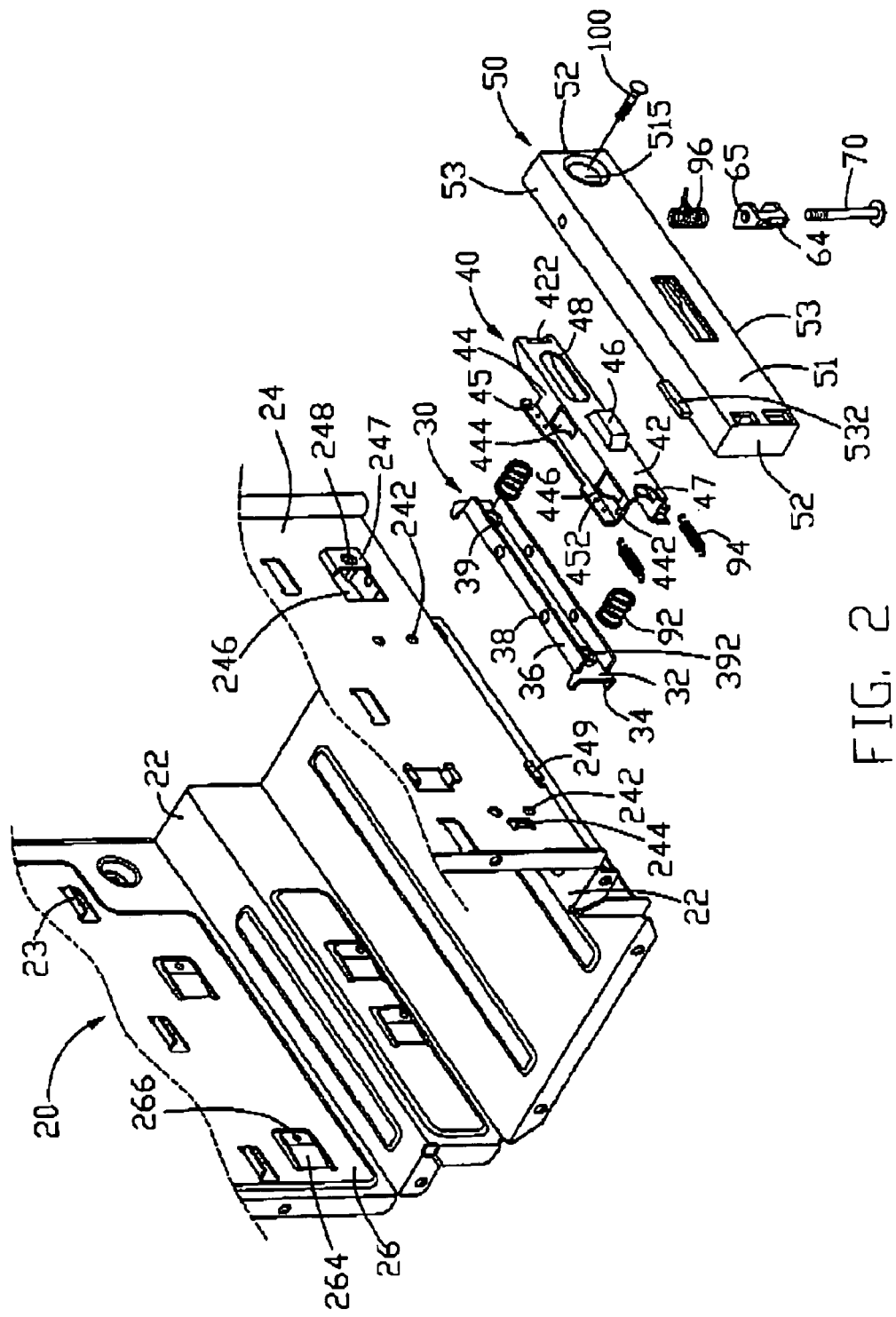
FIGS. 2 and 3 are enlarged, isometric views of the mounting apparatus of FIG. 1, but viewed in different aspects.
Figure 3:
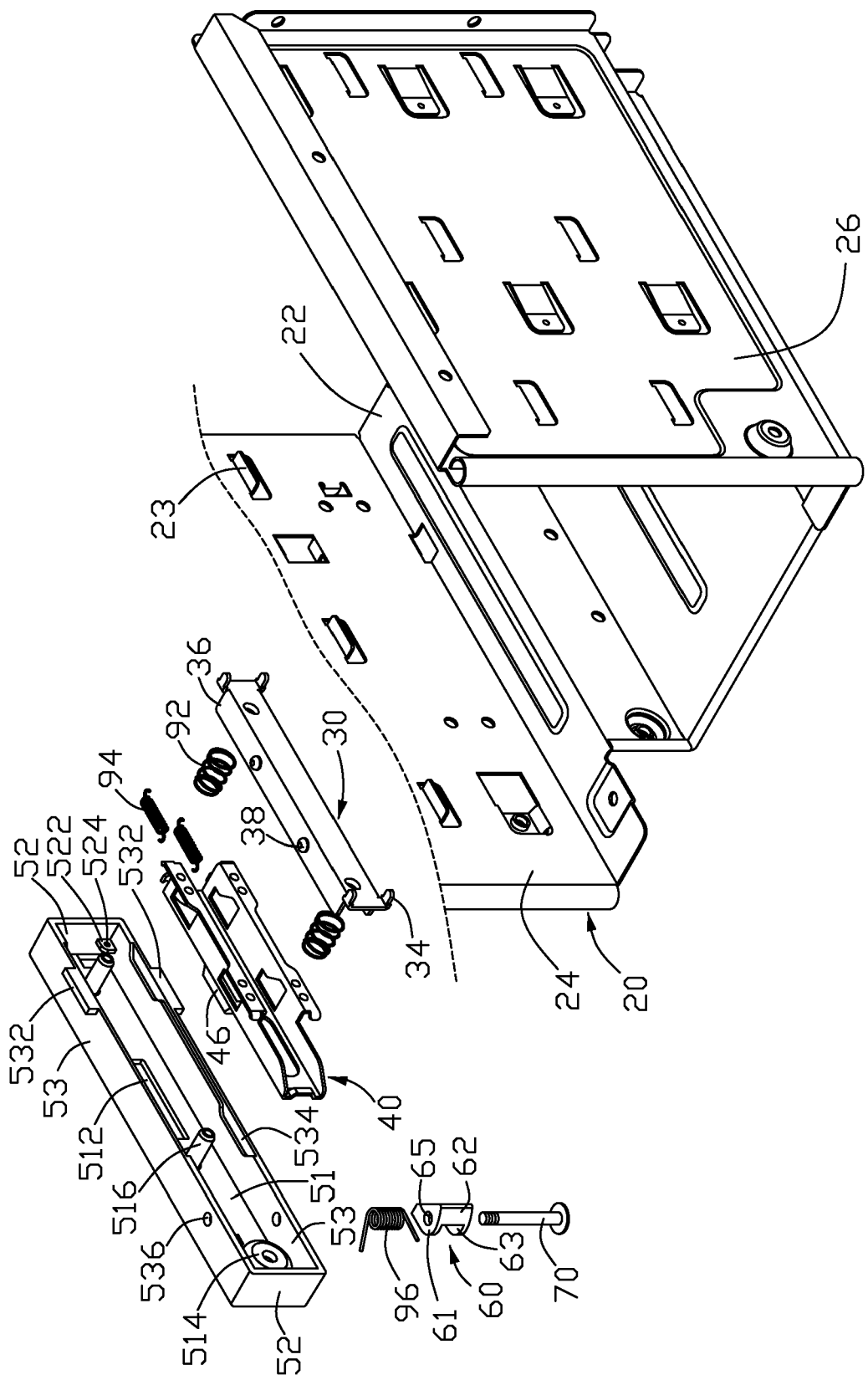

Referring also to FIGS. 2 and 3, the bracket 20 includes a pair of parallel side panels 24, 26. A bent panel 22 extends in from a lower portion of each of the side panels 24, 26, for supporting the storage device 10 thereon. A plurality of guiding tabs 23 extends inward and perpendicularly from upper portions of the side panels 24, 26, for guiding the storage device 10. The side panel 24 includes a blocking tab 244 perpendicularly extending out from a front portion thereof, two pairs of apertures 242 defined in a middle portion thereof, and a bridge 247 extending out from a rear portion thereof, all horizontally aligned. A threaded hole 248 is defined in the bridge 247. The side panel 24 includes a rectangular through hole 246 defined therein beside the bridge 247, and a pair of hooks 249 extending toward the apertures 242 in vertical alignment. The side panel 26 further includes a pair of resilient tabs 264 each with a protrusion 266 extending in therefrom, between the corresponding bent panels 22 and the corresponding guiding tabs 23.

The latch assembly includes a latch member 30, a sliding member 40 as a driving member, a frame 50 as a mounting member, and a pivoting member 60 pivotably attached to the frame 50.

The latch member 30 includes a base plate 32, and a pair of flat walls 36 extending perpendicularly out from opposite longwise edges of the base plate 32. Two pairs of tips 34 as latch portions extend in from corners of the base plate 32. Two pairs of posts 38 extend out from outside surfaces of the pair of the flat walls 36, respectively. A pair of seats 39 each defining a guiding hole 392 extends out from an inside surface of the base plate 32.

The sliding member 40 includes a base board 42, and a pair of side boards 44 extending perpendicularly in from opposite longwise edges of the base board 42. A pair of flanges 45 with a plurality of protrusions 452 extends oppositely and perpendicularly from outer edges of the side boards 44. A pair of hooks 442 extends out and oppositely from front ends of the side boards 44, respectively. Two pairs of slots 444 are defined in main portions of the side boards 44, respectively. Each of the slots 444 has a slanted edge 446, and is narrower in a front portion than a rear portion. A semicircular notch 47 is defined in a front end portion of the base board 42. A catch 422 extends in from a rear end portion of the base board 42. An operating block 46 extends out from the base board 42. A long recess 48 is defined in the base board 42 between the operating block 46 and the catch 422.

Figure 4:
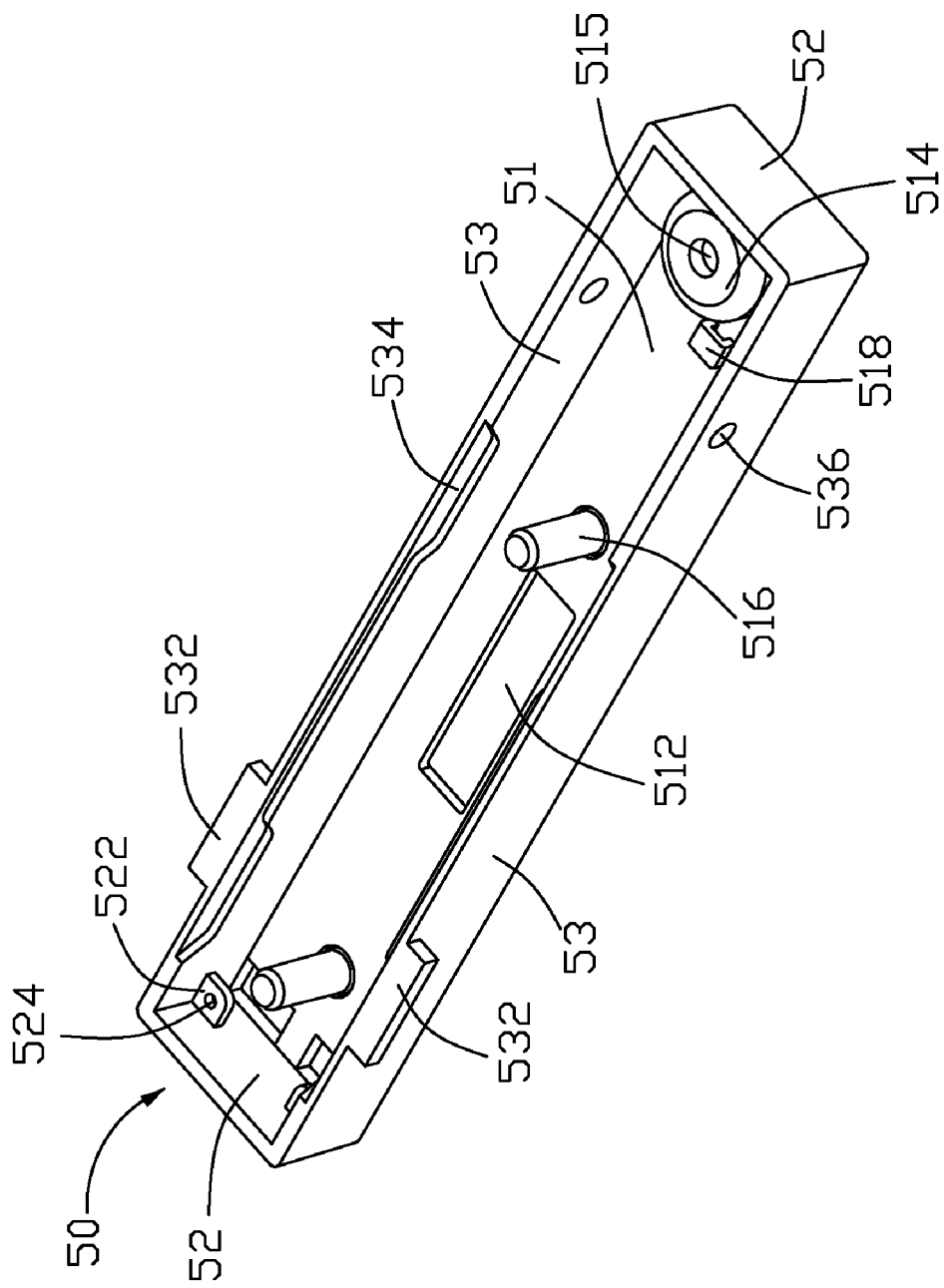
FIG. 4 is an enlarged, isometric view of the frame, but viewed from another aspect.

Referring also to FIG. 4, the frame 50 has a box configuration and includes a base wall 51, a pair of vertical sidewalls 52, and a pair of horizontal sidewalls 53. A groove 512 is defined in the base wall 51. A protrusion 514 extends in from a rear end portion of an inside surface of the base wall 51. A through hole 515 is defined in the protrusion 514. A pair of rods 516 extends in from opposite ends of the groove 512 of the base wall 51, for fixing a pair of first resilient members 92 therearound. A block 518 extends from the inside surface of the base wall 51 beside the protrusion 514. A pair of sliding bars 532 extends perpendicularly from outer edges of the horizontal sidewalls 53, respectively. A pair of flanges 534 extends in from outside edges of horizontal sidewalls 53, respectively. A pair of first pivoting holes 536 is defined in the horizontal sidewalls 53, respectively. Two fixing tabs 522 each defining a fixing hole 524 extend toward each other from inside surfaces of the horizontal sidewalls 53 respectively, together with the hooks 442 of the sliding member 40 to hold a pair of second resilient members 94 therebetween.

The pivoting member 60 includes an upper piece 61, a lower piece 63, and an actuating portion 62 with a cam-shape formed between the upper piece 61 and the lower piece 63. Two vertically aligned second pivoting holes 65 are respectively defined in the upper piece 61 and the lower piece 63, for a pole 70 pivotably extending therethrough. The actuating portion 62 includes a locking tab 64 extending from a rear portion thereof.

Figure 5:
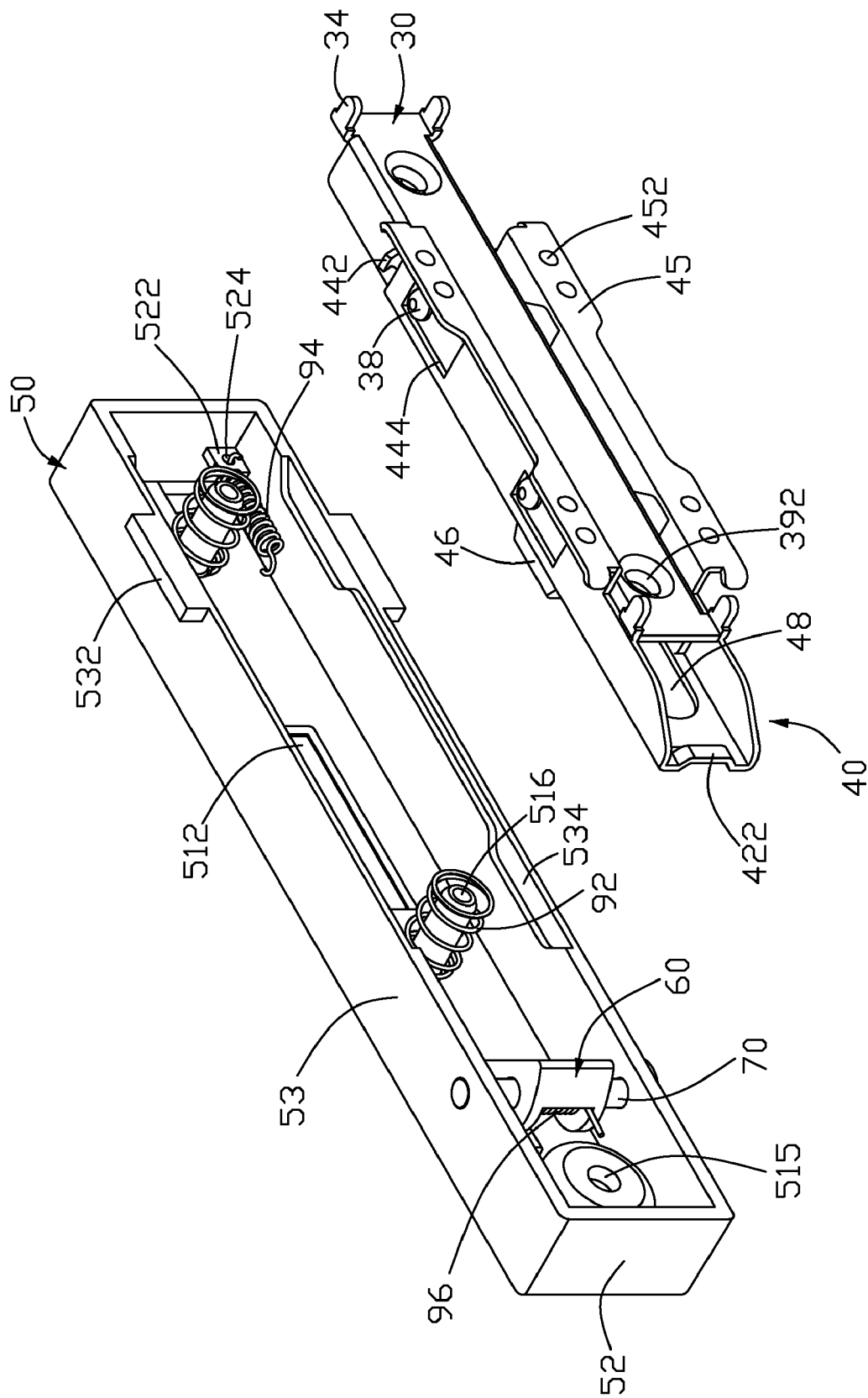
FIG. 5 is an assembled view of the pivoting member attached to the frame and the latch member attached to the sliding member of FIG. 3.
Figure 6:
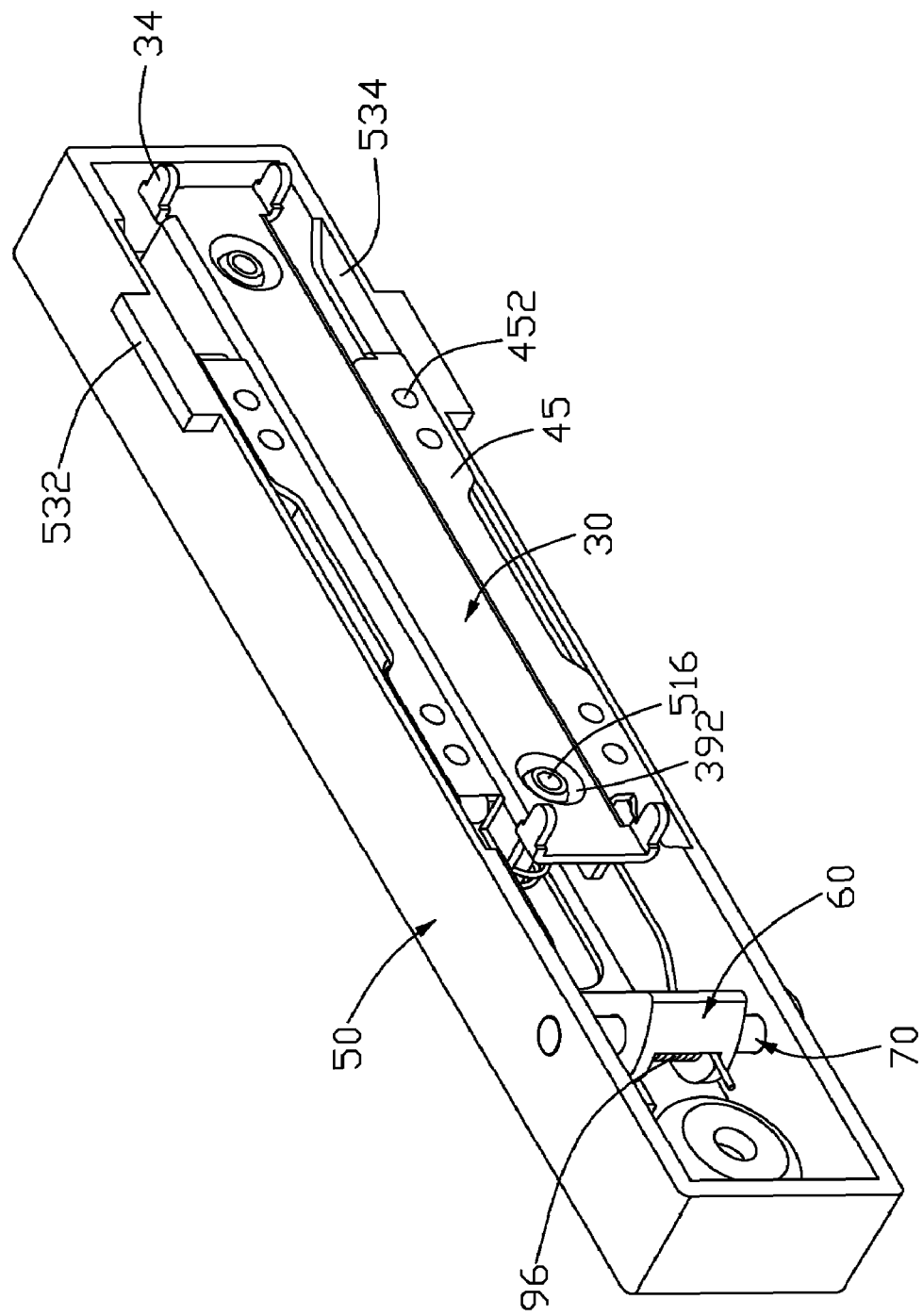
FIG. 6 is an assembled view of FIG. 5.

Referring also to FIGS. 5 and 6, in assembly, a torsion spring 96 as an elastic member is attached to the pivoting member 60, an upper side and a lower side of the torsion spring 96 sandwiched between the upper piece 61 and the lower piece 63 of the pivoting member 60. A through hole of the torsion spring 96 aligns with the second pivoting holes 65 of the pivoting member 60. Then the pivoting member 60 and the torsion spring 96 are attached to the frame 50. The pole 70 is extended through a lower first pivoting hole 536, a lower second pivoting hole 65, the torsion spring 96, an upper second pivoting hole 65, and an upper first pivoting hole 536, in that order. Two free ends of the torsion spring 96 abut against the block 518 of the base wall 51 and the actuating portion 62 of the pivoting member 60, respectively.

The latch member 30 is attached to the sliding member 40, with the posts 38 received in the slots 444 of the side boards 44. The first resilient members 92 are fixed around the rods 516 of the frame 50 respectively. The second resilient members 94 are attached to the frame 50, with one end of each of the resilient members 94 engaging in the fixing hole 524 of the corresponding fixing tab 522 of the frame 50. Then the sliding member 40 and the latch member 30 are attached to the frame 50, with the operating block 46 of the sliding member 40 extending through the groove 512 of the frame 50. The flanges 534 of the frame 50 slidably engage with the flanges 45 of the sliding member 40. One of the rods 516 extends through the semicircular notch 47 of the sliding member 40 to engage in the guiding hole 392 of the corresponding seat 39 of the latch member 30. The other one of the rods 516 of the frame 50 extends through the long recess 48 of the sliding member 40 to engage in another guiding hole 392 of the corresponding seat 39 of the latch member 30. Thus, two ends of the first resilient members 92 contact the base plate 32 of the latch member 30 and the base wall 51 of the frame 50, respectively. Then the second resilient members 94 are attached the sliding member 40, with other end of each of each of the resilient members 94 engage with one of the hooks 442 of the sliding member 40. Thus, the latch assembly is obtained.

Figure 7:
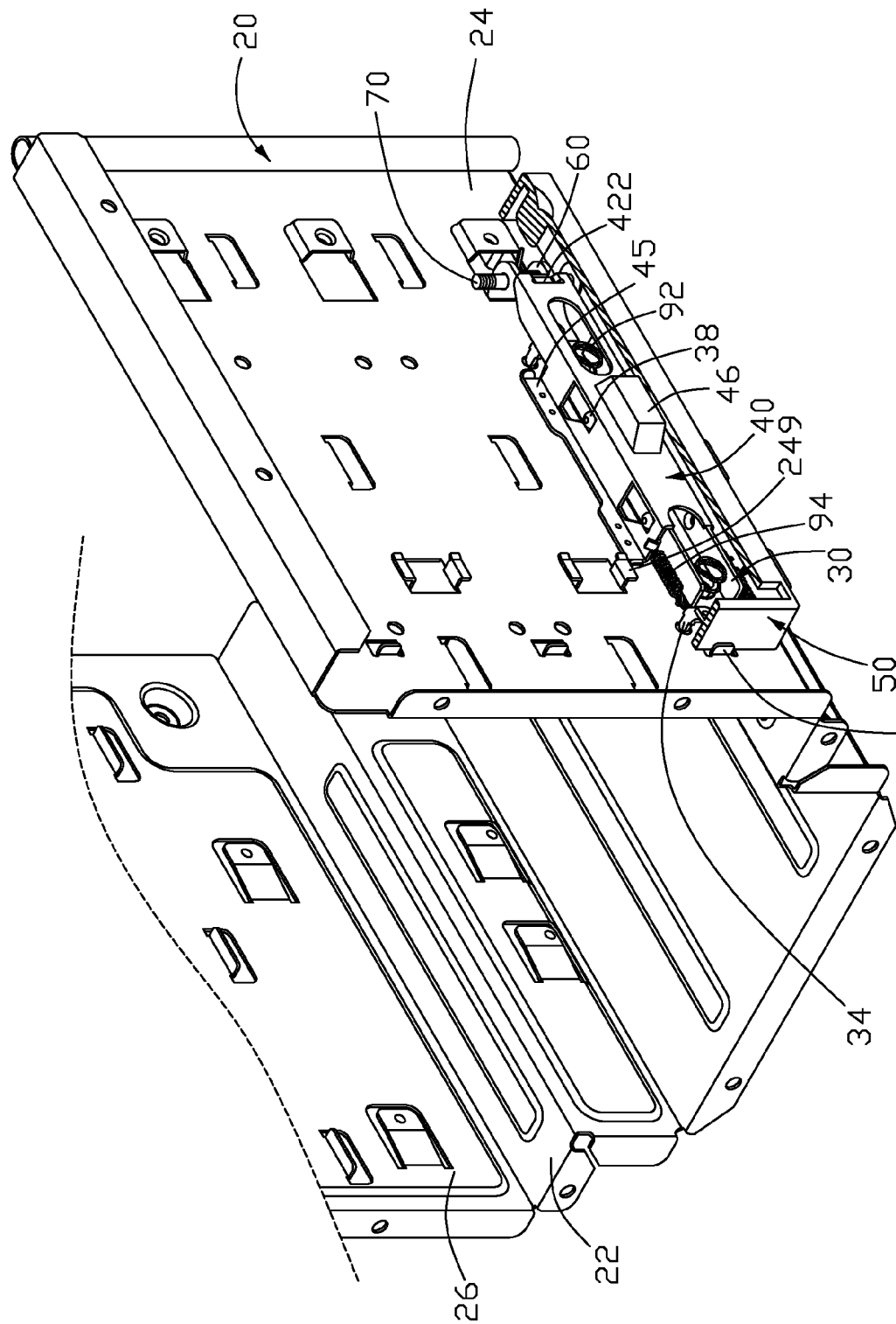
FIG. 7 is an assembled view of FIG. 2, with parts of the latch assembly being cut away.

Referring also to FIG. 7, then the latch assembly is attached to the corresponding side panel 24 of the bracket 20, with the sliding bars 532 of the frame 50 engaging with the corresponding hooks 249 of the side panel 24 and the front one of the vertical sidewalls 52 of the frame 50 abutting the blocking tab 244 of the side panel 24. The tips 34 of the latch member 30 align with the apertures 242 of the side panel 24. A fastener 100 extends through the through hole 515 of the frame 50 to engage in the threaded hole 248 of the bridge 247 of the side panel 24, to fix the latch assembly on the corresponding side panel 24. When the locking tab 64 of the pivoting member 60 engages with the catch 422 of the sliding member 40 and the second resilient members 94 are stretched, the actuating portion 62 of the pivoting member 60 extends into the through hole 246 of the side panel 24 and the posts 38 of the latch member 30 are located in the narrower portions of the slots 444. Thus the sliding member 40 moves close to the latch member 30 and the first resilient members 92 are compressed.

Figure 8:
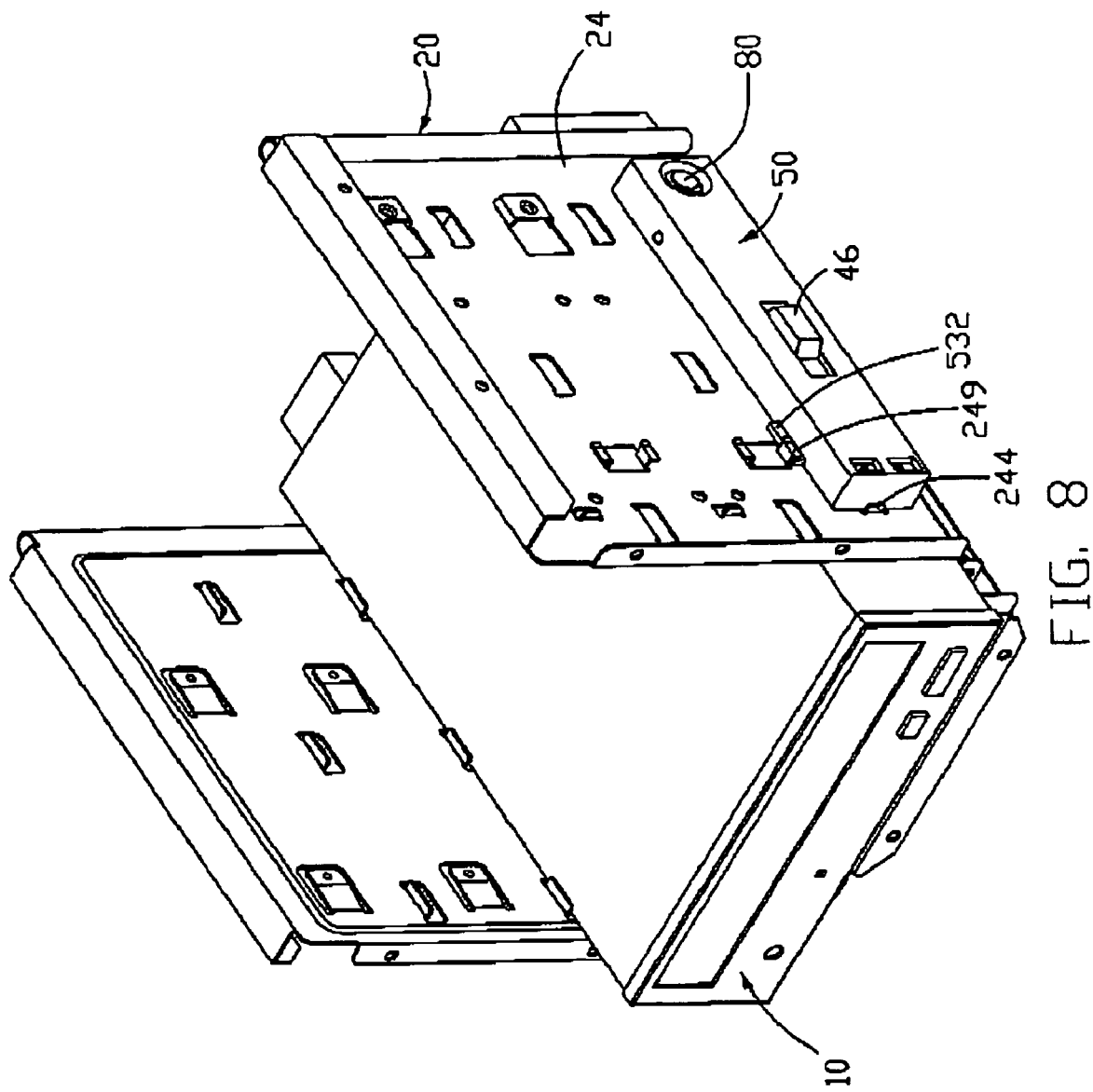
FIG. 8 is an assembled view of FIG. 1.
Figure 9:
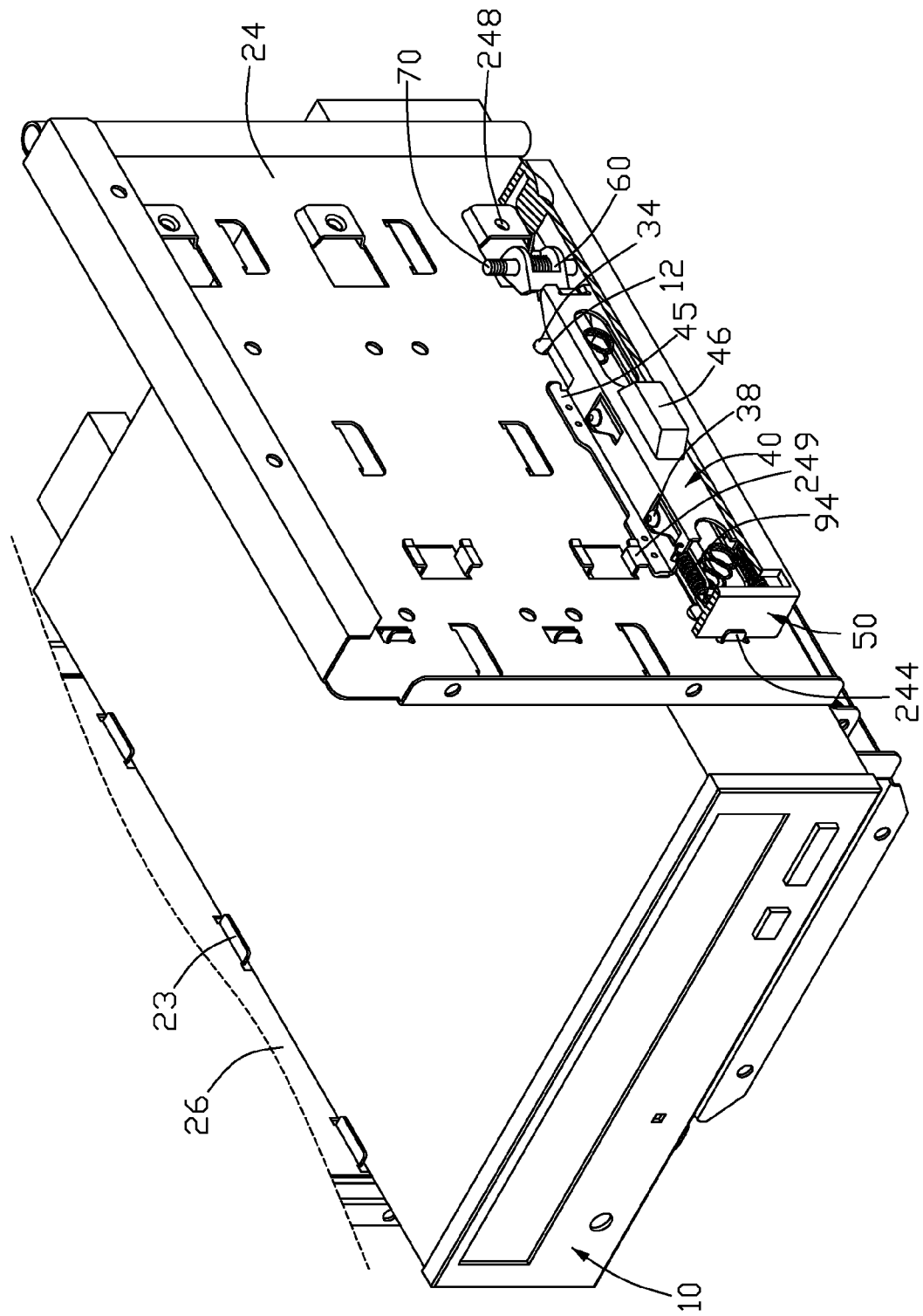
FIG. 9 is an enlarged view of FIG. 8, with parts of the latch assembly being cut away.

Referring also to FIGS. 8 and 9, the storage device 10 is inserted into the bracket 20 in a front-to-back direction, with a bottom wall thereof slidably supported on the bent panels 22 of the bracket 20 and an upper wall thereof slidably engaging with the guiding tabs 23 of the bracket 20. When a rear end of the storage device 10 contacts and pushes the actuating portion 62 of the pivoting member 60 out, the pivoting member 60 is rotated about the pole 70 causing the locking tab 64 to disengage from the catch 422 of the sliding member 40, and the torsion spring 96 is twisted. Thus the sliding member 40 moves forward, with rebounding of the second resilient members 94. Accordingly, the posts 38 of the latch member 30 are thereby moved from the narrower portions to the wider portions of the slots 444. The latch member 30 is then driven toward the side panel 24 of the bracket 20, with rebounding of the first resilient members 92. Thus, the tips 34 of the latch member 30 extend through the apertures 242 of the bracket 20 and abut the corresponding sidewall 11 of the storage device 10. The storage device 10 keeps moving, and when the tips 34 of the latch member 30 align with the apertures 12 of the storage device 10, the tips 34 extend into the apertures 12 of the storage device 10. Thus the storage device 10 is secured in the bracket 20.

To detach the storage device 10 from the bracket 20, the operating block 46 of the sliding member 40 is pushed rearward to move the sliding member 40 rearward, stretching the second resilient members 94. Accordingly, the posts 38 of the latch member 30 are moved from the wider portions to the narrower portions of the slots 444. The latch member 30 moves toward the latch member 40, that is, moves away from the side panel 24 of the bracket 20 and the first resilient members 92 are compressed. Thus the tips 34 of the latch member 30 accordingly withdraw from the apertures 12 of the storage device 10. The storage device 10 is then drawn forward. When the rear end of the storage device 10 disengages from the actuating portion 62 of the pivoting member 60, the pivoting member 60 rotates back, and the actuating portion 62 extends into the through hole 246 of the side panel 24, with rebounding of the torsion spring 96. The locking tab 64 of the pivoting member 60 then engages with the catch 422 of the sliding member 40.

When the sliding member 40 moves toward or away from the side panel 24 of the bracket 20, the rods 516 of the frame 50 slidably move in the guiding holes 392 of seats 39 of the latch member 30. When the sliding member 40 slides frontward and rearward, the protrusions 452 the flanges 45 of sliding member 40 slidably engage with the flanges 534 of the frame 50

Figure 10:
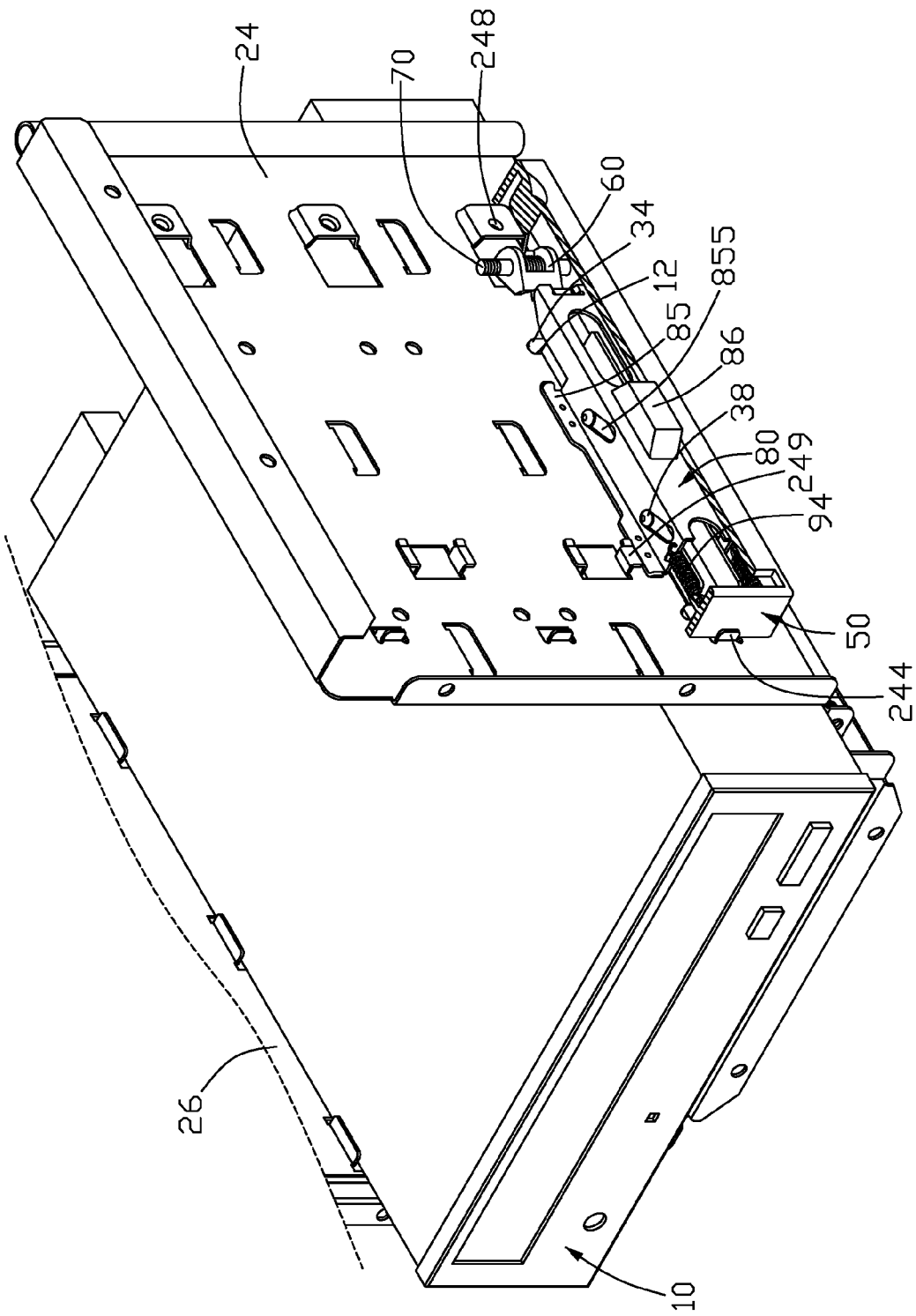
FIG. 10 is an assembled view of a second preferred embodiment of the present invention.

Referring to FIG. 10, all structures of a second embodiment are similar to those of the first embodiment, except the sliding members 80. The sliding member 80 includes a pair of side boards 85 and an operating block 86. Two pairs of slots 855 are slantingly defined in each of the side boards 85 respectively, with a consistent width. When the sliding member 80 is moved in a front-and-back direction, the latch member 30 can be driven to move in a direction perpendicular to the side panel 24 via the posts 38 sliding in the slots 855. The first resilient members 92 used in the first embodiment can be omitted.

It is believed that the present embodiments and theirs advantages will be understood from the foregoing description, and they will be apparent that various changes may be made thereto without departing from the spirit and scope of the invention or sacrificing all of its material advantages, the example hereinbefore described merely being preferred or exemplary embodiments.

What is claimed is:

1. A mounting apparatus for a storage device defining a plurality of apertures in a sidewall thereof, the mounting apparatus comprising:

a bracket comprising a plurality of apertures defined in a side panel thereof, corresponding to the apertures of the storage device; and a latch assembly attached to the side panel of the bracket and comprising a frame fixed to the side panel, a sliding member slidably attached to the frame, and a latch member with tips attached to the sliding member, the sliding member being capable of moving in a direction parallel to the side panel to allow the latch member to move toward or away from the side panel in a direction perpendicular to the side panel which results in the tips of the latch member accordingly engaging in or disengaging from the apertures of the storage device;

wherein the sliding member comprises a base board, and a pair of side boards extending from opposite edges of the base board, a pair of slots is defined in each of the side boards, the latch member comprises a base plate, and a pair of flat walls extending from opposite edges of the base plate, a pair of posts extends from each of the flat walls for slidably engaging in the slots;

wherein the base plate of the latch member comprises a pair of seats each defining a guiding through hole therein, the base board of the sliding member comprises a semicircular notch, and a recess defined therein, the frame comprises a base wall, the base wall comprises a pair of rods, the rods extend through the semicircular notch and the recess to slidably engage in the guiding through hole of the latch member respectively, a pair of first resilient members is fixed around the rods respectively and compressed between the base wall and the base plate.

2. The mounting apparatus as claimed in claim 1, wherein each of the slots has a slanted edge, each of the slots being narrower at one end than at the other end.

3. The mounting apparatus as claimed in claim 1, wherein the slots are slantingly defined in the side boards of the sliding member with a consistent width.

4. The mounting apparatus as claimed in claim 1, wherein the frame further comprises a pair of sidewalls extending from opposite edges of the base wall thereof, a pair of fixing tabs each defining a fixing hole extending from one of the sidewalls, a hook extends from each of the side boards of the sliding member, a pair of second resilient members is disposed between the frame and the sliding member, with ends of the resilient members engaging with the hooks and in the fixing holes.

5. The mounting apparatus as claimed in claim 1, wherein the base wall of the frame comprises a groove defined therein, the base board of the sliding member comprises an operating block extending therefrom to slidably engage in the groove.

6. The mounting apparatus as claimed in claim 1, wherein the side boards of the sliding member comprises a pair of flanges extending outward therefrom, two sidewalls of the frame comprises a pair of flanges extending inward therefrom to slidably engage with the flanges.

7. The mounting apparatus as claimed in claim 1, wherein the latch assembly further comprises a pivoting member attached to the frame via a pole, the pivoting member is pivotable about the pole to drive the sliding member to move.

8. The mounting apparatus as claimed in claim 7, wherein the pivoting member comprises an actuating portion formed in a side portion thereof, the side panel of the bracket comprises a through hole engagably receiving the actuating portion therein.

9. The mounting apparatus as claimed in claim 8, wherein a torsion spring is fixed around the pole, the frame comprises a block extending from a base wall thereof, two ends of the torsions spring abut against the block and the actuating portion of the pivoting member respectively, for keeping the pivoting member at a state which the tips of the latch member are located at disengaging positions.

10. The mounting apparatus as claimed in claim 8, wherein the pivoting member further comprises a locking tab formed in the side portion thereof and spaced from the actuating portion, the base board of the sliding member comprises a catch for engaging with the locking tab.

11. A mounting a apparatus for a storage device comprising:

a bracket configured to receive the storage device therein comprising a side panel defining an opening;

a mounting member fixed with respect to the side panel;

a sliding member slidably mounted to the mounting member and being slidable between a block position and a release position in a back-and-forth direction;

a latch member slidably mounted to the sliding member and being slidable in a left-and-right direction, the latch member comprising at least one latch portion configured for engaging with the storage device;

a pivoting member pivotably mounted to the mounting member, the pivoting member comprising an actuating portion extending through the opening and a locking tab configured for driving the sliding member to slide from the block position to the release position, the pivoting member being pivotable when the actuating portion is driven to move out of the opening which results in the locking tab driving the sliding member to slide from the block position to the release position; and a driving member configured for driving the latch member to move toward the side panel to allow the at least one latch portion engaging with the storage device when the sliding member is moved from the block position to the release position.

12. The mounting apparatus as claimed in claim 11, wherein the pivoting member is pivotable about a pole in an upper-and-down direction and an elastic member is disposed around the pole for urging the pivoting member to locate at its original position where the actuating portion extends through the opening and the locking tab allows the sliding member moving from the release position to the block position and driving the latch member to move away from the side panel.

13. The mounting apparatus as claimed in claim 12, wherein the latch member has at least one post, and the sliding member defined at least one slot for receiving the post, the at least one slot having a slanted edge configured for driving the post to cause the latch member to move away from the side panel when the sliding member moves from the release position to the block position.

14. The mounting apparatus as claimed in claim 13, wherein the driving member comprises an another slanted edge formed at the at least one slot and configured for driving the post to cause the latch member to move toward the side panel when the sliding member moves from the block position to the release position.

15. The mounting apparatus as claimed in claim 11, wherein the driving member comprises an resilient member disposed between the mounting member and the latch member urging the latch member toward the side panel.

16. The mounting apparatus as claimed in claim 11, wherein an resilient member is disposed between the sliding member and the mounting member urging the sliding member toward the block position.

17. A mounting apparatus mounting a storage device therein, comprising:
   a bracket configured to receive the storage device therein comprising a side panel defining an opening;
   a mounting member fixed with respect to the side panel;
   a sliding member slidably mounted to the mounting member and being slidable in a back-and-forth direction;
   a latch member slidably mounted to the sliding member, the latch member comprising at least one latch portion configured to engage with the storage device, the latch member being slidable in a left-and-right direction between an engaging position at which the at least one latch portion is engaged with the storage device and a disengaging position at which the at least one latch portion is disengaged from the storage device;
   a pivoting member pivotably mounted to the mounting member, the pivoting member comprising an actuating portion extending into the bracket via the opening and a locking tab configured for driving the sliding member to slide; and
   a driving member configured for driving the latch member to move toward the side panel, wherein
   when the storage device is mounted into the bracket in the back-and-forth direction the storage device is capable of pushing the actuating portion to move out of the opening to thereby actuate the pivoting member to pivot which results in the locking tab pushing the sliding member to slide from a block position, where the latch member is blocked by the sliding member at the disengaging position, to a release position, where the latch member is movable to the engaging position, in the back-and-forth direction and the driving member driving the latch member to move toward the side panel in the left-and-right direction to cause the at least one latch portion to engage with the storage device.

18. The mounting apparatus as claimed in claim 17, wherein the sliding member comprises a slanted structure configured for driving the latch member to move away from the side panel in the left-and-right direction to cause the at least one latch portion to disengage from the storage device when the sliding member is moved from the release position to the block position.

* * * * *